(12) United States Patent
Weinert

(10) Patent No.: US 8,837,887 B2
(45) Date of Patent: Sep. 16, 2014

(54) WAVEGUIDE AND CONNECTING ELEMENT

(75) Inventor: Carl-Michael Weinert, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 190 days.

(21) Appl. No.: 13/564,847

(22) Filed: Aug. 2, 2012

(65) Prior Publication Data

US 2013/0108218 A1    May 2, 2013

Related U.S. Application Data

(60) Provisional application No. 61/514,531, filed on Aug. 3, 2011.

(30) Foreign Application Priority Data

Aug. 3, 2011  (DE) .......................... 10 2011 080 328
Jun. 26, 2012  (EP) ..................................... 12173530

(51) Int. Cl.
*G02B 6/02*     (2006.01)
*G02B 6/26*     (2006.01)
*G02B 6/38*     (2006.01)
*G02B 6/122*    (2006.01)

(52) U.S. Cl.
CPC .......... *G02B 6/02038* (2013.01); *G02B 6/1228* (2013.01); *G02B 6/262* (2013.01); *G02B 6/02* (2013.01); *G02B 6/38* (2013.01); *G02B 6/021* (2013.01)
USPC ....................................................... 385/123

(58) Field of Classification Search
CPC ............... G02B 6/021; G02B 6/02347; G02B 6/02357; G02B 6/14; G02B 6/02333; G02B 6/02361; G02B 6/036; G02B 6/262; G02B 6/02009
USPC ........................................................ 385/123
See application file for complete search history.

(56) References Cited

U.S. PATENT DOCUMENTS

| 5,333,218 | A  | 7/1994  | Ortiz, Jr.     |
| 2004/0202429 | A1 | 10/2004 | Margalit et al. |
| 2010/0172649 | A1 | 7/2010  | Graves         |
| 2010/0266288 | A1 | 10/2010 | Little et al.  |

FOREIGN PATENT DOCUMENTS

| DE | 19702969 A1 | 8/1997  |
| EP | 0299603 B1  | 11/1992 |
| WO | 0135136 A1  | 5/2001  |

(Continued)

OTHER PUBLICATIONS

D. Wiesmann, et al. 'Large UV-induced negative index changes in germanium-free nitrogen-doped planar SiO2' waveguides, Electronics Letters Feb. 19, 1998 vol. 34 No. 4.

(Continued)

*Primary Examiner* — Charlie Peng
*Assistant Examiner* — Erin Chiem
(74) *Attorney, Agent, or Firm* — Brinks Gilson & Lione

(57) ABSTRACT

A waveguide can have a first longitudinal section, with at least one core having a first refractive index and at least one sheath surrounding the core. The sheath can be made of a material having a second refractive index so the waveguide will guide at least one optical signal in the core. A third longitudinal section has a sheath and a coating surrounding the sheath having a third refractive index so the third longitudinal section of the waveguide will guide at least one optical signal in the sheath. A second longitudinal section, arranged between the first longitudinal section and the third longitudinal section being adapted to guide an optical signal from the core into the sheath.

22 Claims, 3 Drawing Sheets

(56) References Cited

FOREIGN PATENT DOCUMENTS

| WO | 2005090253 | A2 | 9/2005 |
| WO | 2006011117 | A2 | 2/2006 |

OTHER PUBLICATIONS http://www.botda.com/index.php?option=com_content&view=article&id=6%3Afbg&catid=40%3Atechnologies&Itemid=53&lang=en.

H.N. J. Fernando et al. J. Phys. D: Appl. Phys. 37 (2004) 2804-2809.

WAVEGUIDE AND CONNECTING ELEMENT

CROSS-REFERENCE TO RELATED APPLICATIONS

This application is a continuation of U.S. provisional application Ser. No 61/514,531, filed Aug. 3, 2011, which is incorporated herein by reference in its entirety, and additionally claims priority from German application No. 102011080328.9, filed Aug. 3, 2011, and European application No. 12173530, filed Jun. 26, 2012 which are incorporated herein by reference in their entirety.

BACKGROUND OF THE INVENTION

The invention relates to the field of communications engineering and data transmission by means of optical signals. More specifically, the invention relates to a waveguide with a first longitudinal section, which has at least one core with a first refractive index and a sheath with a second refractive index surrounding said core, wherein the waveguide is adapted to guide at least one optical signal in the core.

From U.S. Pat. No. 5,333,218 a waveguide with a core, a sheath and a coating is known. Laser light of a predeterminable wavelength may be coupled into the core of this known waveguide, said laser light being guided by total internal reflection at the interface between the core and the sheath within the core. The outer coating serves to protect the sheath from mechanical damage and contamination.

This known waveguide is tapered conically at one end, with the result that the end side of the waveguide acting as a light exit surface is smaller in size and the angular divergence of the emerging light beam is enlarged. Coupling of optical power between different waveguides or coupling of optical power from an incident free beam into the waveguide may be improved by means of this taper.

Furthermore, it is known from the art to use modulation formats which utilize the modal dispersion of the waveguide to carry information. The known waveguide as outlines above has the disadvantage that the assignment of information carried by different modes guided in the waveguide may be lost at the junctions between different waveguides or at the junction between a waveguide and an optical component. Furthermore, some modes may lay outside the acceptance range of the waveguide, with the result that these modes are lost during coupling-in and thus are permanently removed from the optical signal. Undesired data loss during optical data transmission is the result.

Therefore, it is an object of the invention to improve the coupling of optical power between at least one dielectric waveguide.

SUMMARY

According to an embodiment of the invention, a waveguide may comprise a first longitudinal section, having at least one core with a first refractive index and at least one sheath surrounding said core, said sheath comprising a material having a second refractive index, said waveguide being adapted to guide at least one optical signal in the core, wherein the waveguide furthermore has a third longitudinal section comprising a sheath and a coating surrounding said sheath and comprising a material having a third refractive index, said third longitudinal section of the waveguide being adapted to guide at least one optical signal in the sheath, and the waveguide comprising further a second longitudinal section, being arranged between the first longitudinal section and the third longitudinal section and and being adapted to guide an optical signal from the core into the sheath.

According to another embodiment of the invention a waveguide may comprise a first longitudinal section, comprising at least one core with a first refractive index and at least one sheath surrounding said core, said sheath comprising a material having a second refractive index, and said waveguide being adapted to guide at least one optical signal in the core, a third longitudinal section comprising a sheath and a coating surrounding said sheath and comprising a material having a third refractive index, said third longitudinal section of the waveguide being adapted to guide at least one optical signal in the sheath, and a second longitudinal section, being arranged between the first longitudinal section and the third longitudinal section and wherein the refractive index of the core and the sheath is conformed to one another over the length of the second longitudinal section.

According to another embodiment of the invention a waveguide may comprise a first longitudinal section, comprising at least one core with a first refractive index and at least one sheath surrounding said core, said sheath comprising a material having a second refractive index, and said waveguide being adapted to guide at least one optical signal in the core, a third longitudinal section comprising a sheath and a coating surrounding said sheath and comprising a material having a third refractive index, said third longitudinal section of the waveguide being adapted to guide at least one optical signal in the sheath, and a second longitudinal section, being arranged between the first longitudinal section and the third longitudinal section and wherein the diameter of the core decreases over the length of the second longitudinal section from an initial value to a final value.

According to another embodiment of the invention a connecting element may be adapted to receive a waveguide comprising a first longitudinal section, having at least one core with a first refractive index and at least one sheath surrounding said core, said sheath comprising a material having a second refractive index, said waveguide being adapted to guide at least one optical signal in the core, wherein the waveguide furthermore has a third longitudinal section comprising a sheath and a coating surrounding said sheath and comprising a material having a third refractive index, said third longitudinal section of the waveguide being adapted to guide at least one optical signal in the sheath, and the waveguide comprising further a second longitudinal section, being arranged between the first longitudinal section and the third longitudinal section and and being adapted to guide an optical signal from the core into the sheath.

A waveguide according to the invention is thus divided into three longitudinal sections. In the first longitudinal section in the sense of the present description, the optical waveguide has a structure known from the art with a core and a sheath. In some embodiments, the core may have a diameter of from approximately 10 µm to approximately 80 µm. In some embodiments, the surrounding sheath may have a diameter of from approximately 50 µm to approximately 250 µm. In some embodiments, the sheath may be surrounded by an optional coating, which may be adapted to prevent mechanical damage and/or contamination of the outer side of the sheath. In some embodiments, the coating may be opaque. Such an opaque coating may be adapted to prevent the ingress of parasitic light.

In some embodiments of the invention, the core, the sheath and the coating may be manufactured from a polymer or from different polymers. In other embodiments of the invention, the core and/or the sheath may be manufactured from a glass or from different types of glass. In still another embodiment of the invention, the core and/or the sheath may be manufactured from a ceramic, e.g. a ceramic comprising $SiO_2$. The core, sheath and/or coating may, in some embodiments of the invention, comprise a dopant in order to adjust the electrical conductivity and/or the refractive index to predeterminable values.

A waveguide according to the invention may be integrated onto a substrate such as silicon to form a part of an integrated optical component. In other embodiments, the waveguide may comprise an optical fibre.

In some embodiments of the invention, the first, second and third longitudinal sections cited merely represent a theoretical concept without the waveguide having necessarily any interruption transverse to its longitudinal extent or any joint between the longitudinal sections, i.e. the first, second and third longitudinal sections are made from a single part.

According to the invention, an optical signal is totally reflected internally at the interface between the core and the sheath and is thus guided in the core. This part of the waveguide is referred to as the first longitudinal section. At least at one end of the waveguide, the optical signal is guided at the interface between the sheath and the coating. This part of the waveguide is referred to as the third longitudinal section. As a result, the effective diameter of the waveguide is enlarged and, in accordance with Liouville's theorem, the angular divergence is reduced, with the result that the phase space volume occupied by the optical signal may be coupled into an adjacent optical waveguide with fewer losses or without any losses and/or with little distortion.

A second longitudinal section may be located adjacent to the first and third longitudinal sections. The second longitudinal section is adapted to guide the signal from the core into the sheath. In some embodiments of the invention, different modes originally guided in the core may be guided to the sheath at different locations alongside the longitudinal extent of the second longitudinal section. At the end of the second longitudinal section, the optical power remaining in the waveguide is guided in the sheath, i.e. the total internal reflection of the signal takes place at the interface between the sheath and the coating. The transition of the optical power between the core and the sheath may be carried out in an adiabatic manner.

The third longitudinal section may extend up to the end of the waveguide. The third longitudinal section is adapted to guide the optical power in the sheath, i.e. a total internal reflection of the signal takes place at the interface between the sheath and the coating. At the end of the third longitudinal section, the optical signal or the optical power guided in the waveguide may exit the waveguide via the end side of the waveguide.

If an optical signal is intended to be coupled into a waveguide according to the invention, the described beam path is reversed, i.e. the optical signal is first guided as a free beam or by means of a waveguide to the end side, then guided in the sheath of the third longitudinal section and gradually coupled into the core in the second longitudinal section of the waveguide until the signal is guided fully in the core of the first longitudinal section.

In some embodiments of the invention, the diameter of the core may gradually decrease over the longitudinal extend of the second longitudinal section. Since the number of modes which may be guided in a waveguide decreases with the diameter of its core, the core is adapted to guide a continuously decreasing number of modes as the diameter decreases over the longitudinal extend of the second longitudinal section. The modes which may no longer be guided in the core are coupled out of the core into the surrounding sheath. If the diameter of the core at the end of the second longitudinal section has been reduced to zero or close to zero, the waveguide no longer comprises any effective core at this point, and the total optical power has been coupled into the sheath at the end of the second longitudinal section. An embodiment of the invention which has the same effect as the core running out completely is one in which the core diameter decreases to such an extent that the modes guided in the first longitudinal section may no longer be guided in the reduced core diameter and therefore pass over into the sheath.

In some embodiments of the invention, the diameter of the core decreases with a profile falling strictly monotonically with the length of the second longitudinal section. This feature has the effect that the number of modes propagating in the core decreases monotonically. Thus, the modes are coupled out of the core into the sheath uniformly. By means of avoiding discontinuities of the diameter of the core over the length, mode distortions are reduced. Such distorsions would make the reproduction of the modulated data more difficult. The strictly monotonic profile may depend in some embodiments of the invention linear, quadratic or exponential from the longitudinal extent.

In some embodiments of the invention, the refractive index of the core is conformed to the refractive index of the sheath along the longitudinal extent of the second longitudinal section. In this embodiment of the invention, the diameter of the core may not change, but the difference in the refractive index between the core and the sheath becomes increasingly smaller as the longitudinal extent of the second longitudinal section increases, in a similar manner to how this takes place for a known graded-index fibre in the radial direction. Owing to the increasingly smaller difference between the core and the sheath, which may ultimately be eliminated or dissolved completely at the end of the second longitudinal section, the modes capable of propagation in the core are transferred into the sheath along the second longitudinal section until they are finally guided completely in the sheath.

In some embodiments of the invention, the refractive index of the core is conformed to the refractive index of the sheath with a profile falling strictly monotonically with the length of the second longitudinal section. This results in a continuous reduction in the number of modes being guided in the core until ultimately no modes are guided in the core of the waveguide at the end of the second longitudinal section. The strictly monotonic profile may depend in some embodiments of the invention linear, quadratic or exponential from the longitudinal extent.

In some embodiments of the invention, the parameter $$V = \frac{\pi \cdot d_K \cdot \sqrt{n_K^2 - n_M^2}}{\lambda}$$

in the first and second longitudinal sections and the parameter $$V = \frac{\pi \cdot d_M \cdot \sqrt{n_M^2 - n_B^2}}{\lambda}$$

in the third longitudinal section deviate from one another by less than 5%, less than 2% or less than 0.5%. The parameters V are calculated from the first refractive index $n_K$ of the core, the second refractive index $n_M$ of the sheath, the third refractive index $n_B$ of the coating, the diameter $d_K$ of the core, the diameter $d_M$ of the sheath and the wavelength $\lambda$ of the optical signal being intended to be guided in the waveguide. The parameters V define the number and form of the modes being able to propagate in a waveguide of the respective cross section. If the parameters V along the longitudinal extent of the waveguide are approximately constant, the form and number of the modes propagating does not change with the length of the waveguide. As a result, the signal quality or the modal dispersion of the waveguide is not changed, and the signal may be coupled out of the waveguide or into the waveguide with low losses and enhanced signal quality.

In some embodiments of the invention, the third refractive index $n_B$ may be smaller than the second refractive index $n_M$, which for its part is smaller than the first refractive index $n_K$. As a result, a total internal reflection of the signal may occur either at the interface between the core and the sheath, or as well as at the interface between the sheath and the coating. An evanescent field may occur in adjoining material layers of the sheath or the coating at the locations of the total internal reflection. For the purposes of the present invention, this should nevertheless be considered to be total internal reflection, even if the reflected power does not completely correspond to the power radiated in.

In some embodiments of the invention, the third refractive index $n_B$ of the coating may be calculated from the first refractive index $n_K$, the second refractive index $n_M$, the diameter $d_K$ of the core and the diameter $d_M$ of the sheath, as follows:

$$n_B = n_M - (n_K - n_M) \cdot \left(\frac{d_K}{d_M}\right)^2.$$

In this embodiment, the refractive index of the sheath fulfills the above condition at least in the third longitudinal section. In the first longitudinal section, the third refractive index may also assume a different value. In the second longitudinal section, the refractive index owing to the changing diameter $d_K$ of the core and/or the changing refractive index $n_K$ of the core may have a profile which changes with the length of the second longitudinal section. If the third refractive index satisfies the cited condition, a virtually constant parameter V results along the length of the waveguide and thus the abovementioned effects on the quality of the optical signal result.

In some embodiments of the invention, the second longitudinal section may have a length of from approximately 5 mm to approximately 10 cm. In some embodiments of the invention, the second longitudinal section may have a length of 10 mm to approximately 5 cm. Such a longitudinal extent results in a gradual transition of the modes from the core into the sheath, with the result that the signal quality is influenced as little as possible.

In some embodiments of the invention, the diameter $d_M$ of the sheath in the first, second and third longitudinal sections may deviate from one another by less than 1%, less than 0.5% or less than 0.1%. In contrast to known waveguides, which taper toward the end, the waveguide according to the invention has an approximately constant outer diameter. Only the diameter and/or the refractive index of the core change in the second longitudinal section. As a result, the connection of two waveguides is simplified and coupling losses are reduced. Thus, the proposed waveguide may advantageously be used in a connecting element for connecting at least two waveguides.

In some embodiments of the invention, the end side of a first waveguide adjoins the end side of a second waveguide. The first waveguide comprises first, second, and third longitudinal sections as detailed previously. The second waveguide comprises a first longitudinal section only, i.e. the second waveguide has at least one core with a first refractive index and a sheath surrounding said core with a second refractive index. The diameter of the sheath in the third longitudinal section of the first waveguide may differ from the diameter of the core in the first longitudinal section of the second waveguide by less than 1%, less than 0.5% or less than 0.1%. Since the second waveguide has a constant diameter of the sheath and the core and the modes are only guided in the core, this waveguide has a large angular acceptance. If such a waveguide known per se is coupled to the waveguide according to the invention with reduced angular divergence, the optical power may be transmitted with low losses and/or distorsions.

In some embodiments of the invention, a connecting element may comprise a housing by means of which the two waveguides may be positioned on a common optical axis. As a result, the waveguides may be fixed mechanically securely and may be connected to one another in a simple manner and may be disconnected again given a corresponding housing design.

BRIEF DESCRIPTION OF THE DRAWINGS

Embodiments of the present invention will be detailed subsequently in greater detail referring to the appended drawings, in which.

DETAILED DESCRIPTION OF THE INVENTION

Figure 1:
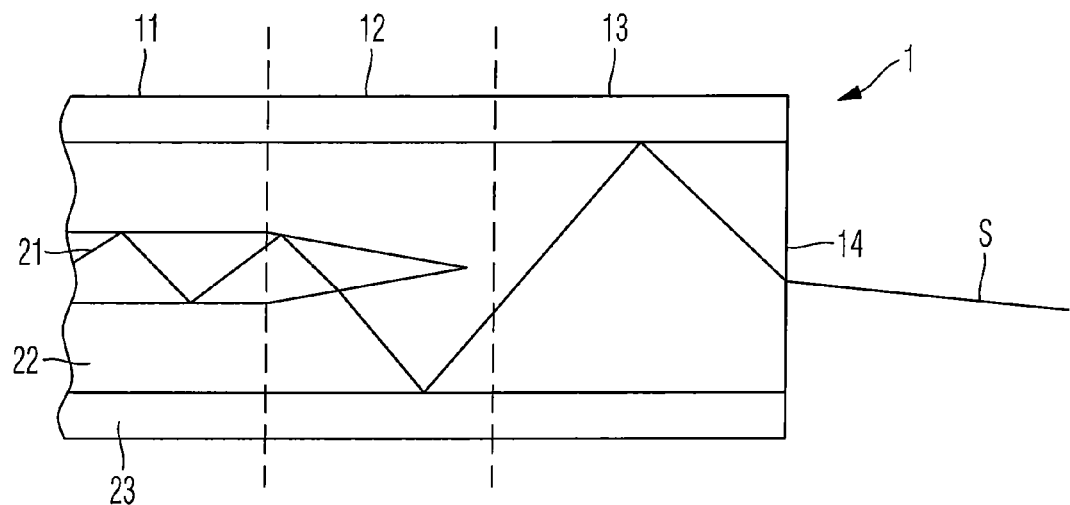
FIG. 1 shows a cross section through a first embodiment of a waveguide.

FIG. 1 shows a section through a waveguide in accordance with a first embodiment of the invention. The waveguide 1 comprises, in the first longitudinal section 11, a core 21 which is surrounded by a sheath 22. For its part, the sheath 22 is surrounded by an optional coating 23. The cross section of the core and the sheath may be polygonal or round. The diameter or the perimeter of the core 21 may in some embodiments of the invention be between 10 μm and 80 μm. The diameter or the perimeter of the sheath may be approximately 50 μm to approximately 250 μm. The core and/or sheath may consist of a polymer, a ceramic, or a glass. In some embodiments of the invention, the core and/or the sheath may comprise $SiO_2$. The material of the core and/or the material of the sheath may comprise dopants in order to obtain a predefined refractive index and/or a predefined electrical conductivity. In some embodiments of the invention, the core 21 may be manufactured inside a substantially homogeneous sheath 22 by irradiation with UV light or femtosecond-laser pulses.

The refractive index of the sheath 22 is smaller than the refractive index of the core 21 with the result that an optical signal S is totally reflected at the interface between the core and the sheath. The signal is guided in the interior of the core along the longitudinal extent of the waveguide 1. The modes being able to propagate in the core 21 are defined by the refractive index, the wavelength and the diameter of the core 21.

The first longitudinal section 11 may be surrounded by an optional coating 23, The coating 23 may comprise at least one polymer. The coating 23 may be adapted to prevent mechanical damage, contamination or the ingress of parasitic light to the sheath and/or to the core.

The first longitudinal section 11 is adjoined by a second longitudinal section 12. Over the length of the second longitudinal section 12, the diameter of the core 21 is reduced. In the embodiment illustrated, the diameter is reduced linearly along the longitudinal extent of the second longitudinal section 12. In other embodiments of the invention, the decrease in the diameter may also be quadratic, cubic, exponential or have another profile. The curved profile chosen in each case may be found by means of a computer simulation. The invention does not teach a specific, mandatory profile for the diameter.

In the embodiment illustrated in FIG. 1, the diameter of the core 21 decreases down to zero towards the end of the second longitudinal section 12. In other embodiments of the invention, a remaining residual cross section of the core may remain.

Since the number of modes capable of propagation in the core 21 decreases with the diameter, increasingly fewer modes are guided in the core 21 along the longitudinal extent of the second longitudinal section 12. The modes which are no longer capable of propagation in the core 21 leave the core 21 and enter the sheath 22. The medium surrounding the sheath 22, for example the coating 23, has a lower refractive index than the material of the sheath 22. As a result, optical signals are totally reflected internally at the interface between the sheath 22 and the coating 23. The modes guided in the core 21 in the first longitudinal section 11 are therefore at least partially guided in the sheath 22 over the length of the second longitudinal section 12. For this purpose, the second longitudinal section may have a length of from approximately 5 mm to approximately 10 cm.

The second longitudinal section 12 is adjoined by a third longitudinal section 13. In the third longitudinal section 13, the cross section of the core 21 is reduced to such an extent that at least one mode of the signal S is guided exclusively in the sheath 22. If the diameter of the core 21 has been reduced to zero, the entire optical signal is guided in the sheath 22. The end of the third longitudinal section 13 is constituted by the end side 14. At the end of the third longitudinal section 13, the optical signal S reaches the end side 14 of the waveguide 1 and emerges from the waveguide 1 through this end side 14. Since the diameter of the sheath 22 or the end side 14 is greater than the diameter of the core 21, the angular divergence of the optical signal S owing to Liouville's theorem is less than the angular divergence of the signal in the core 21. The representation of the signal S in FIGS. 1, 2 and 7 should insofar only be understood schematically and is not true to scale.

In some embodiments of the invention, the parameter $$V = \frac{\pi \cdot d_K \cdot \sqrt{n_K^2 - n_M^2}}{\lambda}$$

may be kept constant by matching the respective refractive indices of the sheath and the coating over the length of the first, second and third longitudinal sections. As a result, the number and form of the modes capable of propagation in the waveguide does not change along the longitudinal extent thereof. Thus, the signal may be transported unchanged from the core 21 to the end side 14 without degeneration of the optical signal occurring in the second or third longitudinal section. The data transmitted by the signal S may thus be reconstructed substantially fault-free.

Figure 2:
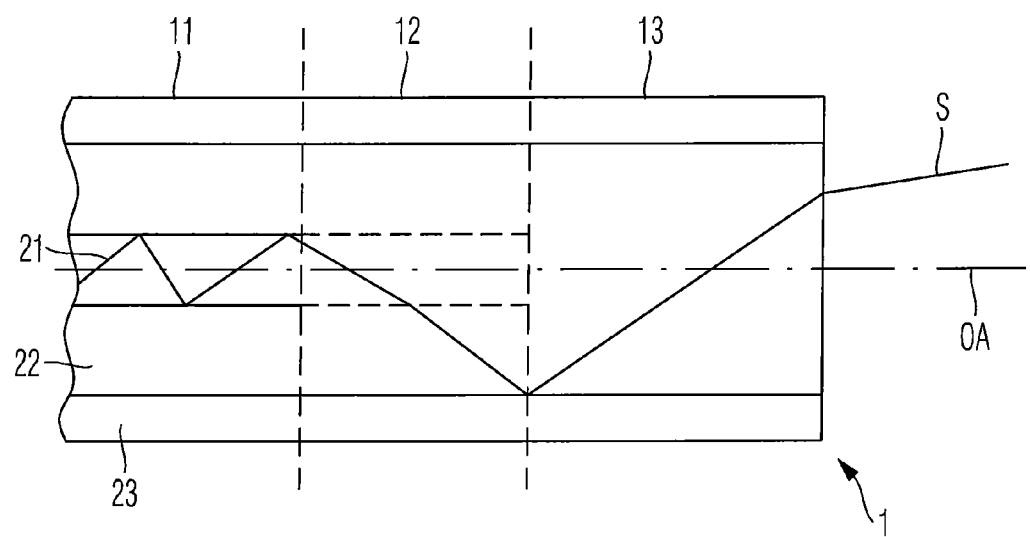
FIG. 2 shows a cross section through a waveguide in accordance with a second embodiment.

FIG. 2 shows a cross section through a waveguide in accordance with a second embodiment of the invention. Same parts are denoted with same reference numbers. Therefore, the description below is restricted to the differences in comparison with the first embodiment, which has been explained with reference to FIG. 1.

The waveguide shown in FIG. 2 also has a first, a second and a third longitudinal section 11, 12 and 13. The design of the first longitudinal section 11 shown in FIG. 2 is identical to the design of the first longitudinal section 11 shown in FIG. 1. Likewise, the design of the third longitudinal section 13 may be identical in both embodiments.

In the second longitudinal section 12, which is adapted to guide the optical signal from the core 21 to the sheath 22, the diameter of the core 21 does not change according to the second embodiment. Instead, the refractive index of the core 21 and the sheath 22 is gradually conformed to one another over the length of the second longitudinal section 12. This may be achieved by material processing with laser radiation or by a changing dopant concentration.

Such a continuous transition from the core to the sheath by a changing profile of the refractive index in the radial direction is known from the art as a graded-index fibre, which results in different modes propagating being totally reflected internally at different radial distances of the core. The effective diameter of the core 21 is therefore different in size for different modes. The invention now proposes realising such a continuous profile of the refractive index additionally or exclusively along the longitudinal extent of the second longitudinal section 12.

In a manner of speaking, the core 21 is more and more dispersed in the sheath 22 with increasing longitudinal extent of the second longitudinal section 12. In some embodiments, the core 21 is in the sheath 22 no longer identifiable at the end of the second section abutting the third section. This also results in the number of modes capable of propagation of the signal S decreasing gradually and thus, the modes being passed over from the core 21 into the sheath 22.

In a third embodiment of the invention, the principles explained for the first and second embodiments can be combined, i.e. the diameter of the core 21 decreases and the refractive indices of the core 21 and the sheath 22 conform to each other along the length of the second section 12 of the waveguide.

Figure 3:
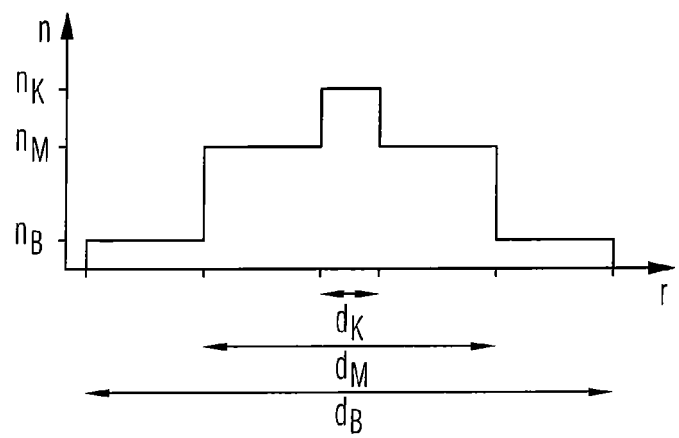
FIG. 3 shows the radial profile of the refractive index in the first longitudinal section of the first embodiment.

FIG. 3 shows the radial profile of the refractive index in the first longitudinal section 11 of the proposed waveguide. The embodiment illustrated in FIG. 3 shows a stepped profile of the refractive index, i.e. a refractive index varying radially with a Heaviside-Function. The material of the core 21 has the greatest refractive index $n_K$. The core is arranged concentrically in the waveguide 1 and has the diameter $d_K$. The sheath 22 has a slightly smaller refractive index $n_M$. The sheath 22 features the diameter $d_M$ and is arranged concentrically around the core 21. For its part, the sheath is surrounded by a coating with the refractive index $n_B$, said coating defining the outer diameter $d_B$ of the waveguide. Owing to the reducing refractive index, light may be totally reflected internally at the interface between the core 21 and the sheath 22. In the same way, light may be reflected at the interface between the sheath 22 and the coating 23. If the proposed waveguide comprises a graded-index fibre in the first longitudinal section, the transition between the core 21 and the sheath 22 would not follow the Heaviside-Function as detailed in FIG. 3, but would show a more steady profile.

Figure 4:
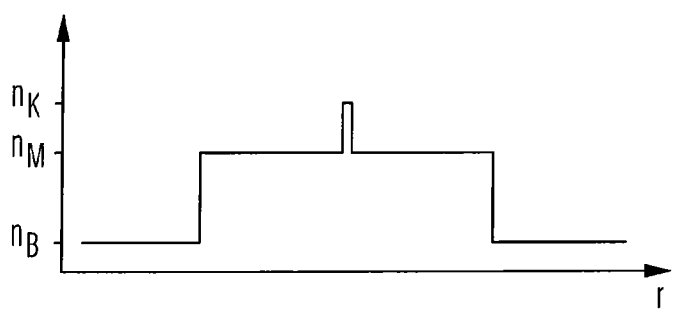
FIG. 4 shows the profile of the refractive index at a point on the second longitudinal section of the first embodiment.

FIG. 4 shows the profile of the refractive index at a point on the second longitudinal section 12 for the first embodiment as shown in FIG. 1. As can be seen from FIG. 4, the diameter of the core 21 is reduced, without its refractive index $n_K$ changing. This results in a reduction in the number of modes capable of propagation, with the result that the excess modes can transfer to the sheath 21.

With respect to the second embodiment of the invention, the value of the refractive index $n_K$ becomes increasingly lower without the diameter $d_K$ of the core changing. With respect to the third embodiment of the invention, the value of the refractive index $n_K$ and the diameter $d_K$ of the core becomes increasingly lower with the length of the second section.

Figure 5:
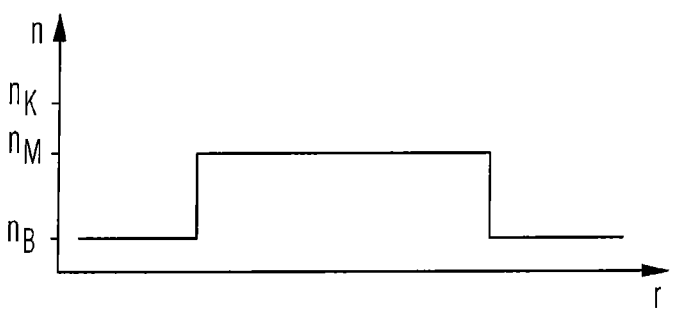
FIG. 5 shows the radial profile of the refractive index in the third longitudinal section of the first embodiment.

FIG. 5 finally shows the profile of the refractive index in the third longitudinal section 13. It can be seen that the waveguide in the third longitudinal section 13 no longer comprises a core. The optical signal is guided completely in the sheath 22.

Figure 6:
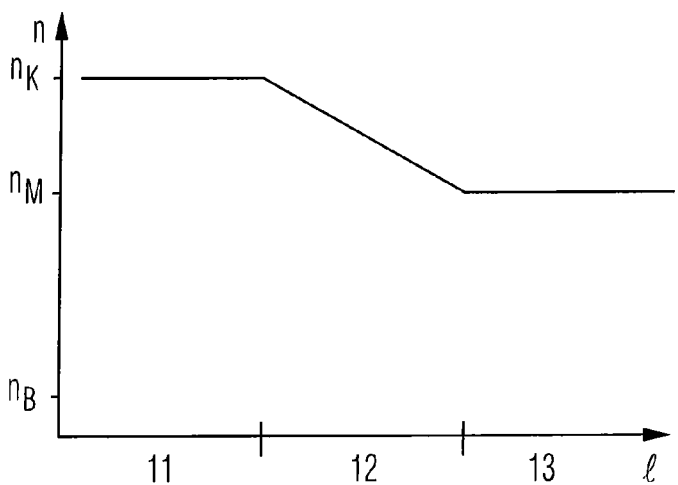
FIG. 6 shows the profile of the refractive index along the optical axis for the second embodiment.

FIG. 6 shows the profile of the refractive index along the optical axis OA for the second embodiment of the present invention. The figure illustrates the value of the refractive index n on the y axis and the length l of the waveguide on the x axis.

In the first longitudinal section 11, the core 21 lies on the optical axis, with the result that the refractive index along the axis shows the constant value $n_K$ of the material of the core. In the third longitudinal section 13, there is no core 21, with the result that the refractive index on the optical axis shows the value $n_M$ of the material of the sheath. In between, the refractive index along the second longitudinal section 12 changes continuously from the value $n_K$ to the value $n_M$.

FIG. 6 illustrates, by way of example, a linear profile. In other embodiments of the invention, however, this profile may also be quadratic, cubic, exponential or have another profile. The invention is in no way limited to the exact profile shown.

Figure 7:
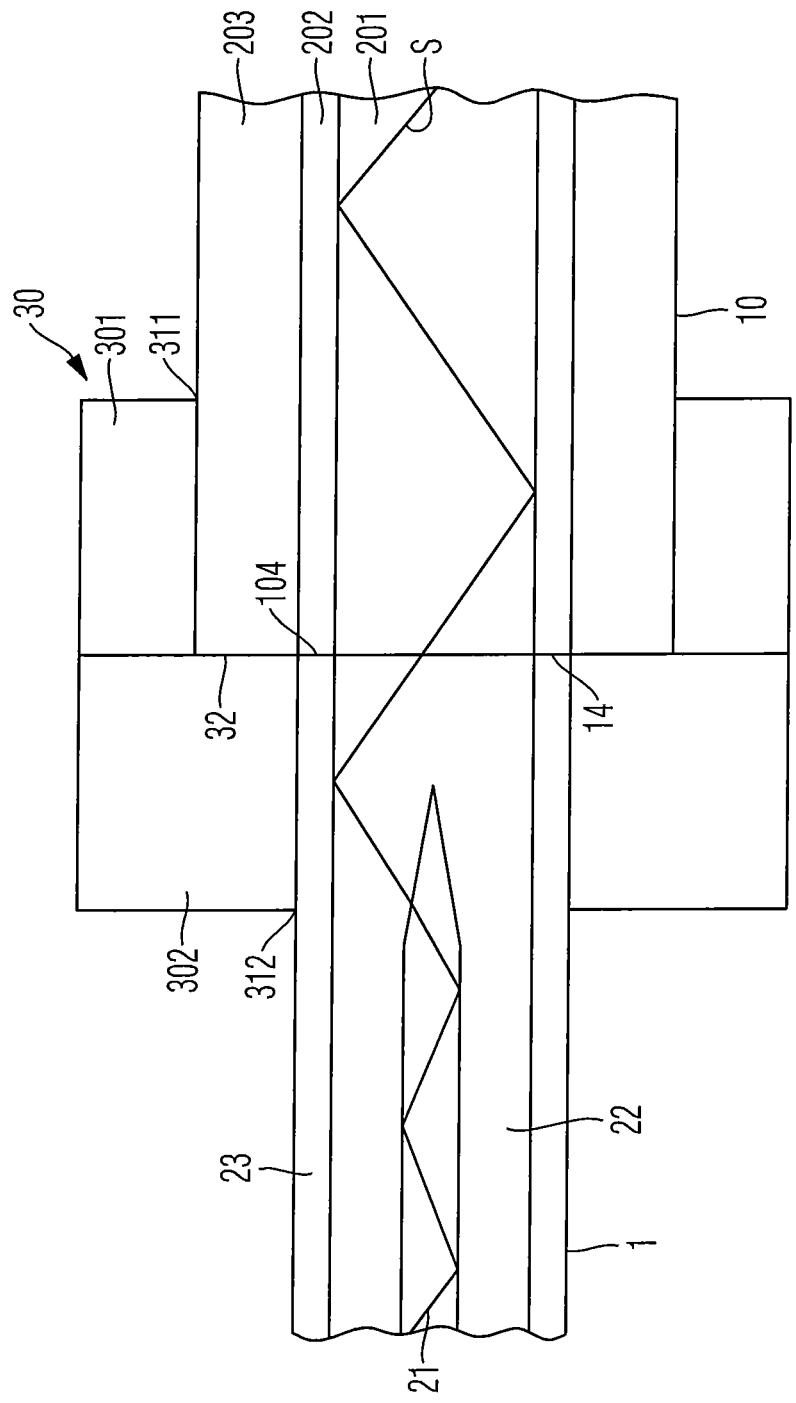
FIG. 7 shows the connection of two waveguides according to one embodiment of the present invention.

FIG. 7 shows the connection of a waveguide 1 according to the invention to a waveguide 10 known from the art. The waveguide 10 has a cross-sectional form which substantially corresponds to the first cross section 11 of the waveguide according to the invention. The diameter of the core 201 of the waveguide 10 is greater than the diameter of the core of the waveguide 1, however.

First, an optical signal S is guided in the core 21 of the waveguide 1. In the second section of waveguide 1, the signal S is coupled from the core 21 to the sheath 22, as described in greater detail above. In the third section of waveguide 1, the signal S is guided inside the sheath to the end side 14. At the end side 14, the optical signal emerges from the waveguide 1. Since the end side 14 adjoins the end side 104 of the waveguide 10, the optical signal S then enters the waveguide 10. If the form of the cross section and the parameter V of the two waveguides 1 and 10 remains unchanged, no distortion or signal losses occur. Since the signal S transfers from the waveguide 1 into the waveguide 10 adiabatically, the described transfer may take place in both directions, i.e. from the waveguide 1 into the waveguide 10 or from the waveguide 10 into the waveguide 1.

A connecting element which comprises a waveguide 1 according to the invention may comprise further a housing 30, which positions both waveguides on a common optical axis and provides a mechanical connection between the two waveguides.

For this purpose, the housing 30 may have a single-part or multi-part design.

In FIG. 7, the housing 30 comprises a first housing part 301 and a second housing part 302, which are connected to one another at a joint 32. The joint 32 may comprise an adhesive bond or a welded connection if the connecting element is intended to provide a nondetachable connection of the waveguides. In other embodiments of the invention, the two housing parts 301 and 302 may be connected to one another detachably at the joint 32 by a plug-type connection or a screw-type connection.

The housing part 301 has a bore 311, in which the waveguide 10 is introduced by means of adhesive bonding, welding or a press fit. Correspondingly, the second housing part 302 has a bore 312, which receives the waveguide 1. The two bores 311 and 312 may be used as positioning aids in order to align the waveguides 1 and 10 on a common optical axis.

It has to be noted that the invention is not restricted to the embodiments illustrated in the figures. The above description should be considered as being illustrative instead of limiting. The following claims are to be understood to the extent that a mentioned feature is present in at least one embodiment of the invention. This does not exclude the possibility of the presence of other features. If the claims and the description above define "first", "second", and "third" features, this designation is intended to distinguish between two identical features, without establishing any kind of order of precedence.

The invention claimed is:

1. A waveguide comprising
a first longitudinal section, comprising at least one core with a first refractive index and at least one sheath surrounding said core, said sheath comprising a material having a second refractive index, and said waveguide being adapted to guide at least one optical signal in the core,
a third longitudinal section comprising a sheath and a coating surrounding said sheath and comprising a material having a third refractive index, said third longitudinal section of the waveguide being adapted to guide at least one optical signal in the sheath, and
a second longitudinal section, being arranged between the first longitudinal section and the third longitudinal section and wherein the diameter of the core decreases over the length of the second longitudinal section from an initial value to a final value;
wherein parameters $$V = \frac{\pi \cdot d_K \cdot \sqrt{n_K^2 - n_M^2}}{\lambda}$$

in the first and second longitudinal sections and parameter $$V = \frac{\pi \cdot d_M \cdot \sqrt{n_M^2 - n_B^2}}{\lambda}$$

in the third longitudinal section differ from one another by less than 5%, less than 2% or less than 0.5%, where $n_K$ is the first refractive index, $n_M$ is the second refractive index, $n_B$ is the third refractive index, $d_K$ is the diameter of the core, $d_M$ is the diameter of the sheath, and λ is the wavelength of the optical signal which may be conducted in the waveguide.

2. The waveguide according to claim 1, wherein the diameter of the core decreases over the length of the second longitudinal section strictly monotonically.

3. The waveguide according to claim 1, wherein the following equation applies for the first refractive index $n_K$, the second refractive index $n_M$ and the third refractive, index $n_B$:
$n_B \leq n_M \leq n_K$.

4. The waveguide according to claim 1, wherein the following equation applies for the first refractive index $n_K$, the second refractive index $n_M$, the third refractive index $n_B$, the diameter $d_k$ of the core (21) and the diameter $d_M$ of the sheath (22):

$$n_B = n_M - (n_K - n_M) \cdot \left(\frac{d_K}{d_M}\right)^2.$$

5. The waveguide according to claim 1, wherein the second longitudinal section has a length of from approximately 5 mm to approximately 10 cm, or from approximately 10 mm to approximately 5 cm.

6. The waveguide according to claim 1, wherein the diameter $d_M$ of the sheath in the first, second and third longitudinal sections (11, 12, 13) differs from one another by less than 1%, less than 0.5% or less than 0.1%.

7. The waveguide according to claim 1, wherein the waveguide is integrated onto a substrate.

8. The waveguide according to claim 1, wherein the waveguide comprises an optical fibre.

9. The waveguide according to claim 1, wherein the first, second and third longitudinal sections are formed as a single seamless part.

10. A waveguide comprising:
a first longitudinal section, comprising at least one core with a first refractive index and at least one sheath surrounding said core, said sheath comprising a material having a second refractive index, and said waveguide being adapted to guide at least one optical signal in the core,
a third longitudinal section comprising a sheath and a coating surrounding said sheath and comprising a material having a third refractive index, said third longitudinal section of the waveguide being adapted to guide at least one optical signal in the sheath, and
a second longitudinal section, being arranged between the first longitudinal section and the third longitudinal section and wherein the refractive index of the core and the sheath is conformed to one another over the length of the second longitudinal section,
wherein parameters $$V = \frac{\pi \cdot d_K \cdot \sqrt{n_K^2 - n_M^2}}{\lambda}$$

in the first and second longitudinal sections and parameter $$V = \frac{\pi \cdot d_M \cdot \sqrt{n_M^2 - n_B^2}}{\lambda}$$

in the third longitudinal section differ from one another by less than 5%, less than 2% or less than 0.5%, where $n_K$ is the first refractive index, $n_M$ is the second refractive index, $n_B$ is the third refractive index, $d_K$ is the diameter of the core, $d_M$ is the diameter of the sheath, and λ is the wavelength of the optical signal which may be conducted in the waveguide.

11. The waveguide according to claim 10, wherein the refractive index of the core and the sheath is conformed to one another strictly monotonically.

12. The waveguide according to claim 10, wherein the following equation applies for the first refractive index $n_K$, the second refractive index $n_M$ and the third refractive index $n_B$:
$n_B \leq n_M \leq n_K$.

13. The waveguide according to claim 10, wherein the following equation applies for the first refractive index $n_K$, the second refractive index $n_M$, the third refractive index $n_B$, the diameter $d_k$ of the core (21) and the diameter $d_M$ of the sheath (22):

$$n_B = n_M - (n_K - n_M) \cdot \left(\frac{d_K}{d_M}\right)^2.$$

14. The waveguide according to claim 10, wherein the second longitudinal section has a length of from approximately 5 mm to approximately 10 cm, or from approximately 10 mm to approximately 5 cm.

15. The waveguide according to claim 10, wherein the diameter $d_M$ of the sheath in the first, second and third longitudinal sections (11, 12, 13) differs from one another by less than 1%, less than 0.5% or less than 0.1%.

16. The waveguide according to claim 10, wherein the waveguide is integrated onto a substrate.

17. The waveguide according to claim 10, wherein the waveguide comprises an optical fibre.

18. The waveguide according to claim 10, wherein the first, second and third longitudinal sections are formed as a single seamless part.

19. A connecting element for connecting at least two waveguides, said connecting element being adapted to receive at least one first waveguide comprising a first longitudinal section, having at least one core with a first refractive index and at least one sheath surrounding said core, said sheath comprising a material having a second refractive index, said waveguide being adapted to guide at least one optical signal in the core, wherein the waveguide furthermore has a third longitudinal section comprising a sheath and a coating surrounding said sheath and comprising a material having a third refractive index, said third longitudinal section of the waveguide being adapted to guide at least one optical signal in the sheath, and the waveguide comprising further a second longitudinal section, being arranged between the first longitudinal section and the third longitudinal section and being adapted to guide an optical signal from the core into the sheath,
wherein parameters $$V = \frac{\pi \cdot d_K \cdot \sqrt{n_K^2 - n_M^2}}{\lambda}$$

in the first and second longitudinal sections and parameter $$V = \frac{\pi \cdot d_M \cdot \sqrt{n_M^2 - n_B^2}}{\lambda}$$

in the third longitudinal section differ from one another by less than 5%, less than 2% or less than 0.5%, where $n_K$ is the first refractive index, $n_M$ is the second refractive index, $n_B$ is the third refractive index, $d_K$ is the diameter of the core, $d_M$ is the diameter of the sheath, and $\lambda$ is the wavelength of the optical signal which may be conducted in the waveguide.

20. The connecting element according to claim 19, further comprising a housing (30), by means of which the two waveguides may be positioned on a common optical axis.

21. The connecting element according to claim 20, wherein the housing comprises a first housing part and a second housing part, which are connected to one another at a joint.

22. The connecting element according to claim 21, wherein the joint comprises any of an adhesive bond or a welded connection or a plug-type connection or a screw-type connection.

* * * * *